(12) United States Patent
Cho et al.

(10) Patent No.: US 8,897,360 B2
(45) Date of Patent: Nov. 25, 2014

(54) METHOD AND APPARATUS FOR ENCODING AND DECODING IMAGES BY ADAPTIVELY USING AN INTERPOLATION FILTER

(75) Inventors: Dae-Sung Cho, Seoul (KR); Woong-Il Choi, Hwaseong-si (KR); Kwan-Woong Song, Seongnam-si (KR); Young-Hun Joo, Yongin-si (KR); Yong-Serk Kim, Seoul (KR); Dong-Gyu Sim, Seoul (KR); Jung-Hak Nam, Seoul (KR); Sea-Nae Park, Seoul (KR); Kwang-Su Jung, Yeongdong-gun (KR)

(73) Assignees: Samsung Electronics Co., Ltd., Suwon-si (KR); Kwangwoon University Industry-Academic Collaboration Foundation, Seoul (KR)

( * ) Notice: Subject to any disclaimer, the term of this patent is extended or adjusted under 35 U.S.C. 154(b) by 489 days.

(21) Appl. No.: 13/146,764

(22) PCT Filed: Jan. 28, 2010

(86) PCT No.: PCT/KR2010/000506
§ 371 (c)(1),
(2), (4) Date: Oct. 11, 2011

(87) PCT Pub. No.: WO2010/087620
PCT Pub. Date: Aug. 5, 2010

(65) Prior Publication Data
US 2012/0033728 A1    Feb. 9, 2012

(30) Foreign Application Priority Data
Jan. 28, 2009    (KR) .................. 10-2009-0006723

(51) Int. Cl.
*H04N 7/12*    (2006.01)
*H04N 19/117*    (2014.01)
*H04N 19/51*    (2014.01)
*H04N 19/61*    (2014.01)

(52) U.S. Cl.
CPC ... *H04N 19/00739* (2013.01); *H04N 19/00066* (2013.01); *H04N 7/50* (2013.01)
USPC ....................................... 375/240.03

(58) Field of Classification Search
CPC ........................................ H04N 7/50
USPC .............. 375/240, 240.13, 240.22, 240.02, 375/240.03
See application file for complete search history.

(56) References Cited

U.S. PATENT DOCUMENTS 6,831,947 B2 *  12/2004  Ribas Corbera ......... 375/240.03
8,509,316 B2 *   8/2013  Rusanovskyy et al. .. 375/240.29
(Continued)

FOREIGN PATENT DOCUMENTS

| KR | 10-2005-0018948 A | 2/2005 |
| KR | 10-0759870 B1 | 9/2007 |
| KR | 10-2008-0041935 A | 5/2008 |

OTHER PUBLICATIONS

International Search Report for PCT/KR2010/000506 issued Aug. 25, 2010 [PCT/ISA/210].

(Continued)

*Primary Examiner* — Sath V Perungavoor
*Assistant Examiner* — James Pontius
(74) *Attorney, Agent, or Firm* — Sughrue Mion, PLLC (57) ABSTRACT

The present invention relates to a method and to an apparatus for encoding and decoding images by adaptively using an interpolation filter in consideration of the characteristics of input images. The apparatus of the present invention comprises a prediction block-generating unit including a selector for adaptively selecting an interpolation filter for generating a prediction block in consideration of the context information of an input image block, a filter bank in which groups of interpolation filters are stored in correspondence with the context information, and a specific interpolation filter which is selected from the filter bank in accordance with the control of the selector, and which interpolates a reference image block associated with the input image block.

17 Claims, 10 Drawing Sheets

(56) References Cited

U.S. PATENT DOCUMENTS

| | | |
|---|---|---|
| 2004/0062307 A1 | 4/2004 | Hallapuro et al. |
| 2008/0008250 A1* | 1/2008 | Mori et al. ............... 375/240.24 |
| 2008/0123947 A1* | 5/2008 | Moriya et al. ............... 382/166 |
| 2012/0114035 A1* | 5/2012 | Nakagomi et al. ....... 375/240.03 |

OTHER PUBLICATIONS

Written Opinion for PCT/KR2010/000506 issued Aug. 25, 2010 [PCT/ISA/237].

* cited by examiner

METHOD AND APPARATUS FOR ENCODING AND DECODING IMAGES BY ADAPTIVELY USING AN INTERPOLATION FILTER

TECHNICAL FIELD

The present invention relates to video coding and decoding and, more particularly, to a method and apparatus for encoding and decoding an image by adaptively using an interpolation filter, taking into account the characteristics of the input image.

BACKGROUND ART

Multimedia transmission is widespread in a recent network environment. Especially, video images occupy a large bandwidth in multimedia communication. In this context, compression techniques aiming at higher transmission rates and better video quality have been proposed.

One of video compression standards is H.264/AVC (MPEG-4 Advanced Video Coding). Like conventional coding techniques such as MPEG-1, MPEG-2, and MPEG-4, H.264/AVC was designed to achieve high-efficiency coding using intra-coding mode and inter-coding mode.

The intra-coding mode relies on the fact that there is a high spatial correlation within one video frame. After prediction data of a current image block to be encoded is generated using adjacent image blocks, spatial redundancy is eliminated from the predicted data in the intra-coding mode. On the other hand, the inter-coding mode relies on the fact that there is a high temporal correlation between images. In the inter-coding mode, prediction data of a current image is generated using images previous to or next to the current image and then temporal redundancy is eliminated from the prediction data. In general, accurate prediction data is generated using an interpolation filter before a prediction block is searched for, in the inter-coding method.

Conventionally, however, interpolation is repeated using only a preset single interpolation filter with no regard to the characteristics of an input image. As a consequence, the conventional interpolation technology is not effective in generating various accurate prediction data, that is, in interpolating an input image in an optimal manner in a recent multimedia communication environment having a variety of images. Another shortcoming with the conventional interpolation technology is high computation complexity in relation to processing high-quality, large-capacity images.

Accordingly, there exists a pressing need for an interpolation scheme having reduced computation complexity, for encoding high-quality, large-capacity images, especially a more accurate interpolation scheme for an input image containing various pieces of video information.

DISCLOSURE

Technical Problem

An object of the present invention devised to solve the conventional problem is to provide a method and apparatus for encoding and decoding an image by adaptively using an interpolation filter, taking into account the characteristics of an input image.

Another object of the present invention is to provide a method and apparatus for encoding and decoding an image by adaptively selecting an interpolation filter from among a plurality of adaptive interpolation filter groups according to context information of an image block.

Another object of the present invention is to provide a method and apparatus for generating a prediction block by adaptively selecting a specific interpolation filter according to context information of an image block, in case of inter-video coding and decoding.

A further object of the present invention is to provide a method and apparatus for generating a prediction block by selectively applying an interpolation filter according to context information of an image block and encoding and decoding an image using the prediction block, in case of inter-video coding and decoding

Technical Solution

In an aspect of the present invention, an apparatus for encoding an image includes a selector for adaptively selecting an interpolation filter for generating a prediction block, taking into account context information of an input image block, a filter bank for storing a plurality of interpolation filters in groups according to the context information, and a prediction block generator including a specific interpolation filter which is selected from the filter bank under control of the selector, for interpolating a reference image block related to the input image block. The context information of the input image block refers to information about a macroblock temporally/spatially adjacent to the input image block or information about the input image block. The context information includes at least one of coding mode information or a quantization value of the spatially adjacent image block, and information about the position of a pixel to be filtered and information about the resolution of a pixel to be interpolated in the temporarily adjacent image block.

In another aspect of the present invention, an apparatus for decoding an image includes a filter bank for storing a plurality of interpolation filters in groups according to the context information, and a prediction block generator including a specific interpolation filter which is selected from the filter bank according to interpolation filter information determined based on context information of a received image block, including at least one of coding mode information, a quantization value, pixel position information, and pixel resolution information, for interpolating a reference image block related to the input image block. The context information of the input image block refers to information about a macroblock temporally/spatially adjacent to the input image block or information about the input image block. The context information includes at least one of coding mode information or a quantization value of the spatially adjacent image block, and information about the position of a pixel to be filtered and information about the resolution of a pixel to be interpolated in the temporarily adjacent image block.

In another aspect of the present invention, a method for encoding an image includes adaptively selecting an interpolation filter from a filter bank that stores a plurality of interpolation filters in groups, taking into account at least one of coding mode information or a quantization value of an image block spatially adjacent to the input image block, and information about the position of a pixel to be filtered and information about the resolution of a pixel to be interpolated in an image block temporarily adjacent to the input image block, interpolating a reference image block related to the input image block using the selected interpolation filter, and determining, as an interpolation filter for generating a prediction block for the input image block, an interpolation filter that minimizes an error difference between the input image block and the reference image block.

In a further aspect of the present invention, a method for decoding an image includes checking interpolation filter information determined based on at least one of coding mode information or a quantization value of an image block spatially adjacent to an input image block, and information about the position of a pixel to be filtered and information about the resolution of a pixel to be interpolated in an image block temporarily adjacent to the input image block, selecting an interpolation filter indicated by the interpolation filter information from a filter bank that stores a plurality of interpolation filters in groups, and generating a prediction block by interpolating a reference image block related to the input image block using the selected interpolation filter.

Advantageous Effects

According to the present invention, an interpolation filter is adaptively selected for use in generating a prediction block, taking into account context information being information about a macroblock temporally/spatially adjacent to an input image block or information about the input image block. Especially, more accurate interpolation is performed by selecting an interpolation filter that minimizes the inter-prediction error between the input image block and a reference image block. That is, the present invention advantageously increases compression performance by selecting an adaptive interpolation filter from among a plurality of interpolation filter groups according to the characteristics of an image and thus eliminating temporal redundancy more readily and more accurately. Further, the computation complexity of interpolation is decreased.

In addition, the present invention provides a method for reducing the overhead of control information caused by use of an adaptive interpolation filter in a wireless channel environment. Accordingly, the present invention actively supports transmission of high-quality, large-capacity video data and adaptive and accurate interpolation of various images.

BEST MODE FOR CARRYING OUT THE INVENTION

An apparatus and method according to the present invention will be described according to embodiments of the present invention, with reference to the attached drawings. Specific details as set forth herein, such as specific components, are provided to help comprehensive understanding of the present invention. It will be clear to those skilled in the art that changes or modifications can be made to the specific details within the scope and spirit of the present invention. A detailed description of known steps related to the present invention is avoided lest it should make the subject matter of the present invention obscure.

With reference to the attached drawings, preferred embodiments of the present invention will be described below in detail.

The present invention is characterized in that interpolation is performed by selecting an interpolation filter, taking into account the type of a video slice and the characteristics of each of a plurality of macroblocks that form the video slice. According to the present invention, since a prediction block is generated using an adaptive interpolation filter reflecting context information of an input image, interpolation is more accurate. Especially the present invention encodes and decodes an image by selectively applying a specific interpolation filter selected from among a plurality of filter groups to the input image. Therefore, when a variety of high-quality, large-capacity images are encoded and decoded, video compression efficiency is increased.

In the present invention, specific interpolation filters are adaptively selected from among a plurality of filter groups, using context information of an image block. After interpolation is repeated using the selected interpolation filters, an interpolation filter that minimizes the prediction error between a current image and a reference image is selected as an optimum interpolation filter. The context information of the input image block refers to information about macroblocks temporarily/spatially adjacent to the input image block or information about the input image block. The context information includes at least one of information about the coding mode of a block spatially adjacent to the input image block or a quantization value of the spatially adjacent block, information about the position of a pixel to be filtered in a temporarily adjacent block, and information about the resolution of a pixel to be interpolated.

FIGS. 1 to 4 illustrate examples of context information of an image block, for use in selecting an optimum interpolation filter applied to the present invention.

Figure 1:
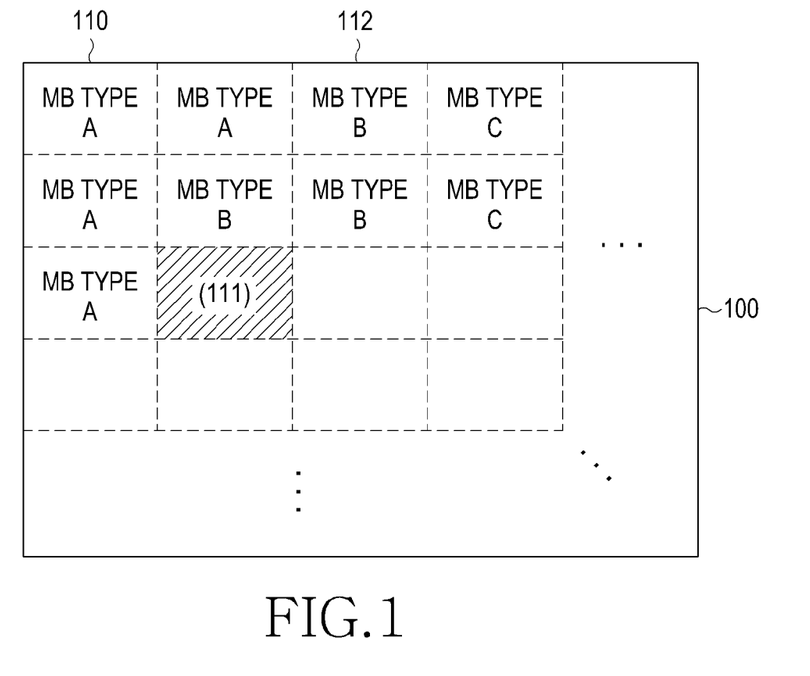
FIGS. 1 to 4 illustrate examples of context information of an image block, for use in selecting an optimum interpolation filter applied to the present invention.

FIG. 1 illustrates coding mode information of a spatially adjacent macroblock, as context information of an image block. Referring to FIG. 1, one video slice 100 is a set of a plurality of pixels.

The video slice 100 may be divided into a plurality of 16×16-pixel MacroBlocks (MBs). An MB is a basic coding unit for an image block, that is, a pixel set of a predetermined size. In the present invention, an image block will be described as an MB of a predetermined size, for the convenience's sake of description. While not shown, if the video complexity of an input slice is low, the slice may be divided into MBs each having a larger size than 16×16, for example, 32×32.

An MB may be encoded in a different coding mode according to its predetermined size. In the international standard established by the standardization organization, ITU-T SG16/Q6 VCEG (Video Coding Expert Group), H.264, for example, intra-coding mode and inter-coding mode are defined. In the intra-coding mode, a pixel is predicted from its spatially adjacent pixels on the basis of each block of a predetermined size such as 16×16, 8×8, or 4×4. A temporal motion is predicted on the basis of a block of a predetermined size such as 16×16, 16×8, 8×16, 8×8, 8×4, or 4×4.

Referring to FIG. 1, a 16×16-pixel inter-coding mode (i.e. type A) is applied to an MB 110, while a 4×4-pixel intra-coding mode (i.e. type B) is applied to an MB 112. Therefore, interpolation is performed by adaptively selecting an interpolation filter according to a coding mode set for a current MB 111 in the present invention.

Figure 2:
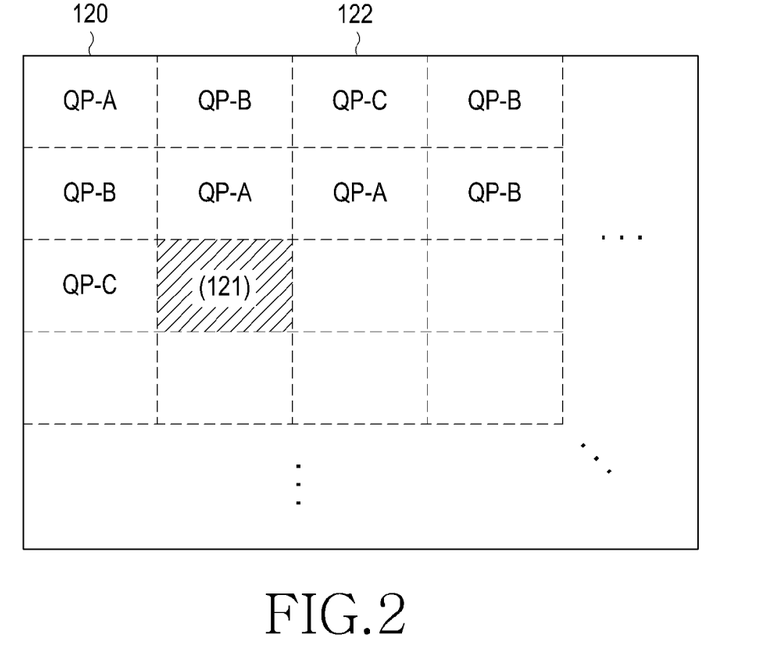

FIG. 2 illustrates a quantization value as context information of an image block.

Quantization will first be described in brief. An MB of a predetermined size is transmitted through quantization, for more efficient use of limited radio resources. More specifically, spectrum data resulting from DCT (Discrete Cosine Transform) of a specific image block is mapped to a specific scalar value according to a Quantization Parameter (QP), prior to transmission. Instead of transmitting spectrum data directly in radio resources, transmission of a scalar value to which the spectrum data is mapped leads to more efficient use of limited radio resources.

For example, on the assumption that the QP of an image block to be transmitted is 10, if the spectrum data of the image block is in the ranges from 0 to 9, from 10 to 19, from 20 to 29, . . . , from 91 to 100, spectrum data ranging from 0 to 9 is mapped to '0' and spectrum data ranging from 10 to 19 is mapped to '1'. Thus, a coding apparatus at a transmission side transmits the scalar value 0 or 1. A decoding apparatus at a reception side receives the scalar value 0 or 1 and recovers the image block by dequantizing the received scalar value 0 or 1. However, even though the scalar value 0 is spectrum data ranging from 0 to 9, the decoding apparatus may recover the scalar value to spectrum data 0. Therefore, data loss may be increased between the actual transmitted image block and the image block interpolated at the reception side.

In other words, as the QP increases, the bit rate of transmitted data is decreased advantageously in terms of use of limited resources. However, data loss is larger with a larger QP, during recovering an image block. On the other hand, as the QP decreases, the bit rate of transmitted data is increased disadvantageously. Nonetheless, quality does not change much between a transmitted image block and an image block interpolated at the reception side. Accordingly, it is important to determine an appropriate QP, considering bit rate efficiency and data loss.

Referring to FIG. 2, QP type A (e.g. a QP of 10) is applied to an MB 120, while QP type B (e.g. a QP of 5) is applied to an MB 122.

Therefore, interpolation is performed by adaptively selecting interpolation filters for generating a prediction block, taking into account the QP of each MB. Then an interpolation filter with a minimal error between a current image block and a reference image block is selected as an optimum interpolation filter, referring to the interpolation results of the adaptively selected interpolation filters. Meanwhile, a different interpolation filter may be selected, considering the presence or absence of an orthogonal transform coefficient in relation to DCT, or a DC and AC distribution.

Figure 3:
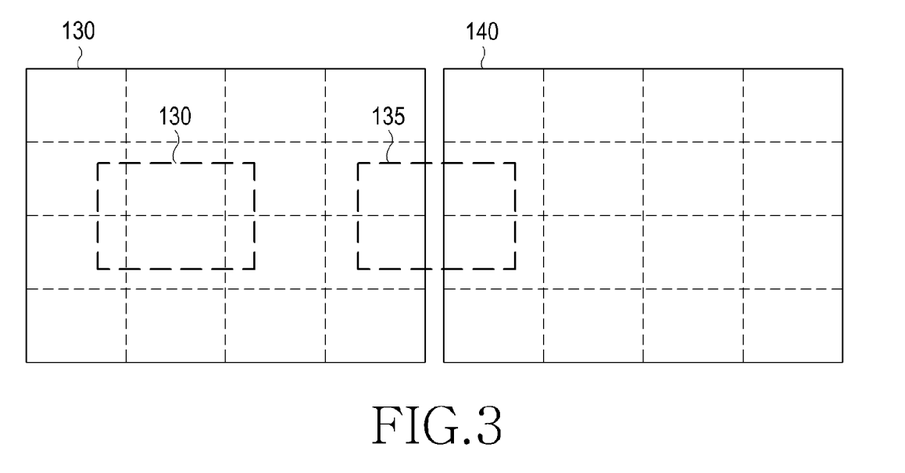

FIG. 3 illustrates information about the position of a pixel to which a filter is applied for interpolation of a previous image, as content information of an image block.

Referring to FIG. 3, reference numerals 130 and 140 denote two adjacent MBs in a previous image. For example, on the assumption that there are two MBs 130 and 140 having different temporal correlations, it is determined whether a specific MB to be encoded is located in an area 131, area A of the MB 130 or in an area 135, area B at the boundary between the two MBs 130 and 140. An interpolation filter for the area 135, area B may need to perform stronger interpolation than an interpolation filter for the area 130, area A. Therefore, interpolation is performed according to the position of a pixel to which an interpolation filter is to be applied, that is, the position of a pixel to be interpolated in the MB according to the present invention.

Figure 4:
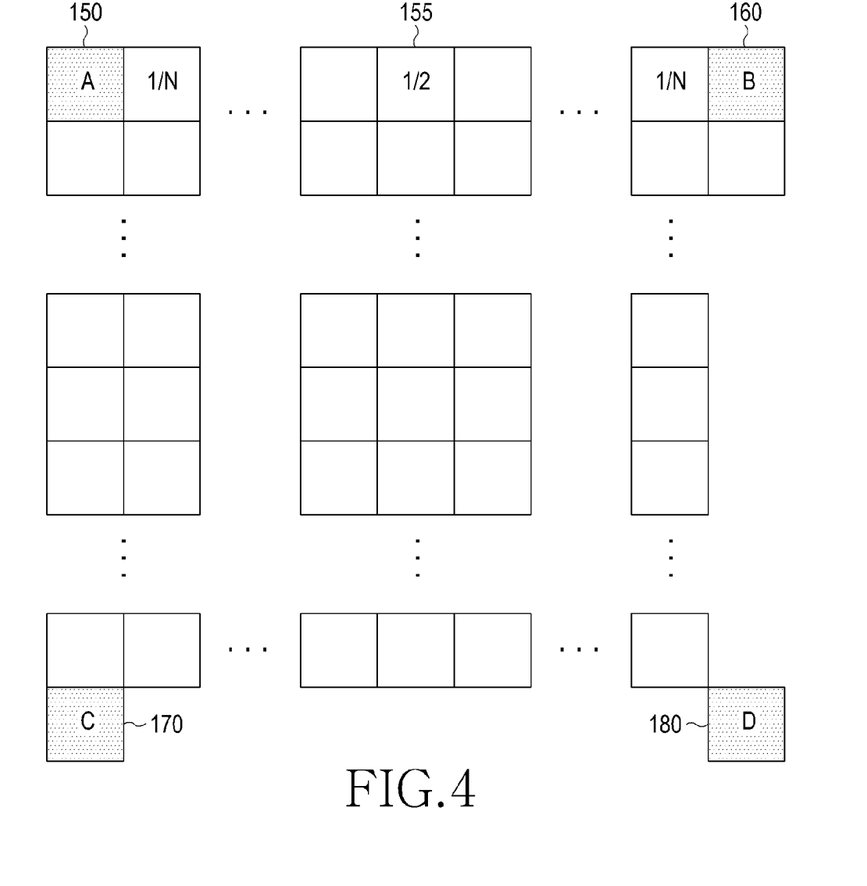

FIG. 4 illustrates the resolution of a pixel to be interpolated, as context information of an image block.

Referring to FIG. 4, a different interpolation filter may be selected according to whether a ½-resolution pixel value 155 or an N/1-resolution pixel value is to be interpolated with respect to integer pixel values 150, 160, 170 and 180 among pixels arranged in a vertical direction or a horizontal direction.

In addition, the context information of the image block may further include MB edge information. That is, a different interpolation filter may be applied according to the presence or absence of edge information in the image block. The directionality of the edge information is also considered in applying an interpolation filter. For example, a different interpolation filter is needed for different interpolation depending on whether an edge is horizontal, vertical, or diagonal.

Figure 5:
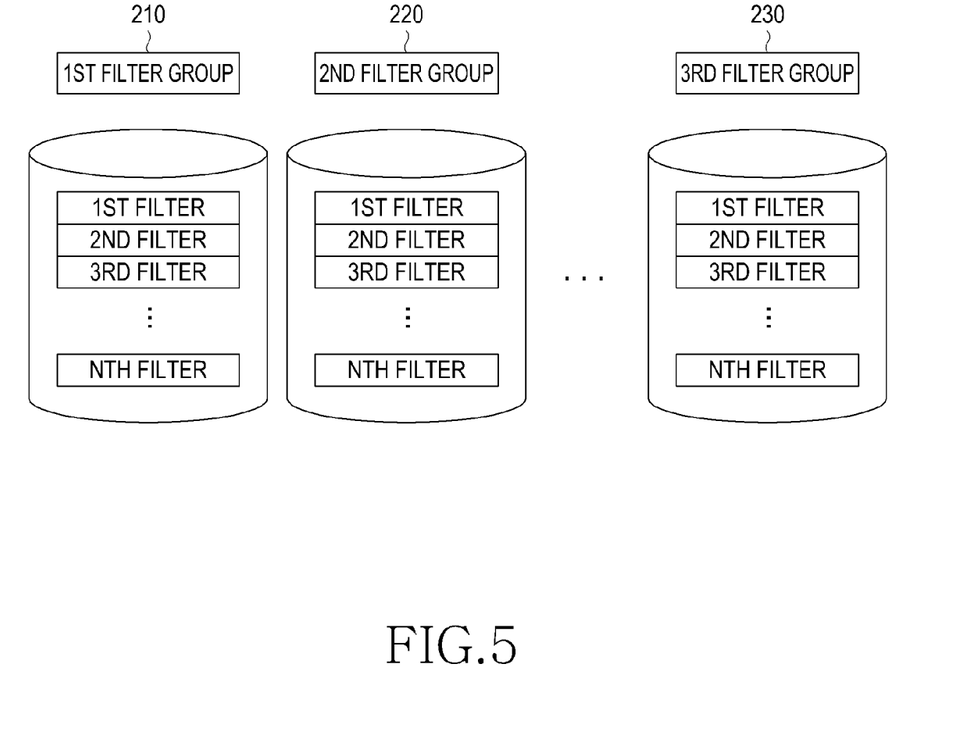
FIG. 5 illustrates the structure of a plurality of filter groups including various filters according to the present invention.

FIG. 5 illustrates the structure of a plurality of filter groups including various filters according to the present invention.

Referring to FIG. 5, filter groups are distinguished according to the characteristics of an input video slice, or the coding mode, QP, pixel position, and pixel resolution of each of a plurality of MBs included in the video slice. The filter groups may be grouped additionally taking into account edge information of the MB.

For instance, a first filter group 210 includes interpolation filters arranged in descending or ascending order of QPs, when coding mode information is applied to an input image on a 16×16-pixel size basis. The first group may include interpolation filters arranged in descending or ascending order of pixel positions. In addition, the interpolation filters may be arranged according to resolutions.

A second filter group 220 includes interpolation filters in a predetermined order of at least one of QP values, pixel positions, and resolutions as context information, when coding mode information is applied to an input image on an 8×8-pixel size.

An $N^{th}$ filter group 230 includes interpolation filters in a predetermined order of at least one of QP values, pixel positions, and resolutions as context information, when coding mode information is applied to an input image on a 4×4-pixel size.

Thus, an interpolation processor adaptively selects an optimum interpolation filter according to context information of an input image to be encoded, from among the plurality of filter groups. That is, the interpolation processor finally selects an interpolation filter that minimizes the error between a current image block to be encoded and a reference image block, as an optimum interpolation filter.

When an optimum interpolation filter is to be selected, a filter used for encoding a previous image block may be used or the most approximate filter among the plurality of adaptive interpolation filter groups may be used for an input image block, using a differential value. The plurality of adaptive interpolation filter groups at each of an encoder and a decoder may be added or updated with a final selected interpolation filter.

FIGS. 6 to 9 illustrate slice structures including interpolation filter information according to the present invention.

Figure 6:
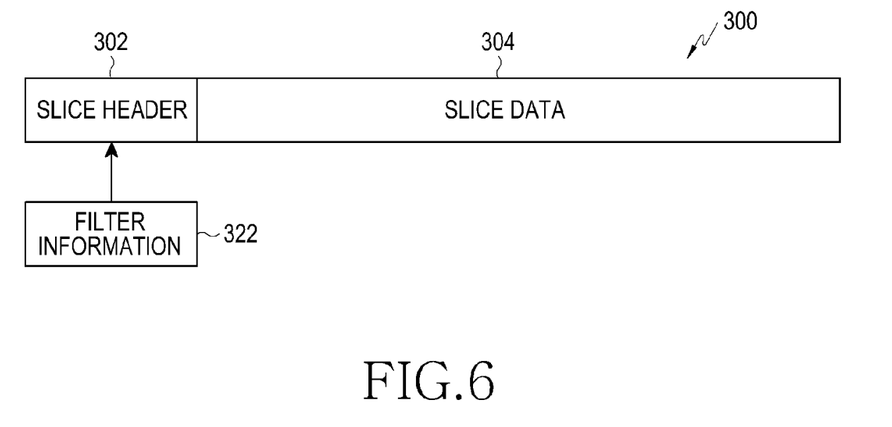
FIGS. 6 to 9 illustrate slice structures including interpolation filter information according to the present invention.

Referring to FIG. 6, reference numeral 300 denotes a slice including interpolation filter information according to an embodiment of the present invention. The slice 300 is divided into two parts, a slice header 302 and slice data 304. The slice header 302 may carry slice type information and order information. The slice data 304 may include video data of the slice.

In accordance with the embodiment of the present invention, the slice header 302 further includes information about interpolation filters that were selected according to context information such as information about coding modes, QP values, pixel positions, and resolutions of a plurality of MBs in the slice. The interpolation filter information may further include differential filter coefficients between a default interpolation filter and the selected interpolation filters, or the indexes of filter groups to which the selected interpolation filters belong. Or the interpolation filter information may further include a differential filter coefficient between a filter used for generating a previous prediction block and the selected interpolation filter for a current input MB.

Figure 7:
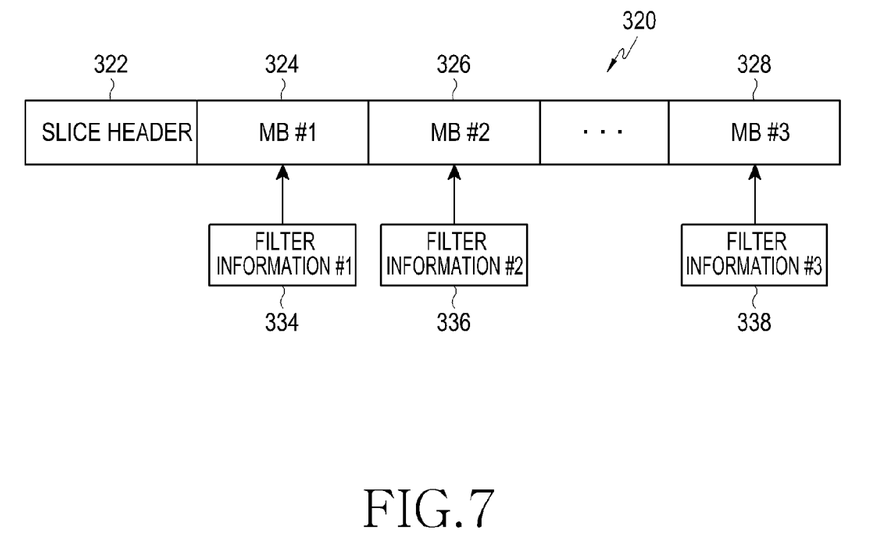

Referring to FIG. 7, reference numeral 320 denotes a slice including interpolation filter information according to another embodiment of the present invention. The slice 320 may include a slide header 322 and a plurality of MBs 324, 326 and 328 as slice data. The slice header 322 may include information about the type and order of the slice. The MBs 324, 326 and 328 further include information 334, 336 and 338 about interpolation filters selected for them according to their coding mode information, QP values, position information, and resolutions.

Figure 8:
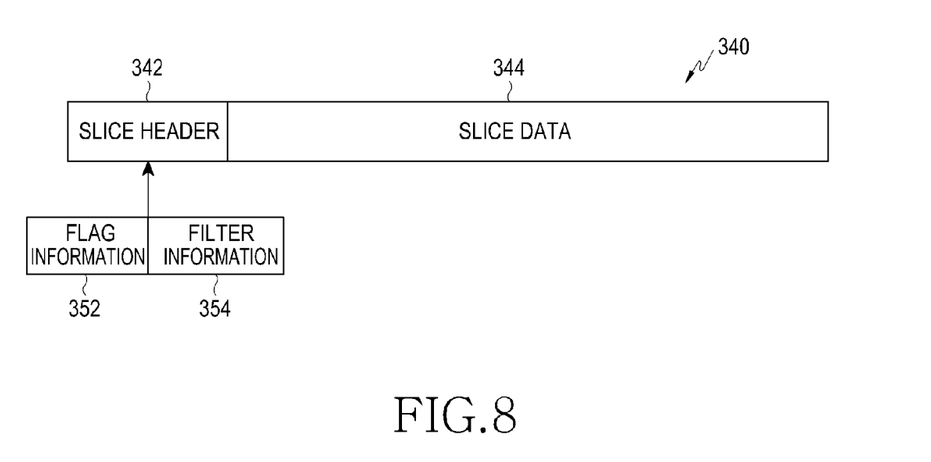

Referring to FIG. 8, reference numeral 340 denotes a slice including flag information indicating selection of a new interpolation filter according to a third embodiment of the present invention. The slice 340 is divided into two parts, a slice header 342 and slice data 344.

The slice header 342 includes information about the type and order of the slice, flag information 352 indicating use of a new interpolation filter selected according to context information such as coding mode information, QP values, position information, and resolutions of a plurality of MBs in the slice, and information 354 about selected interpolation filters. The slice data 344 may include the video data of the slice.

For example, if a default interpolation filter is used, the flag information 352 is set to '0'. If a new interpolation filter is used for a current input image block, the flag information 352 is set to '1'.

Figure 9:
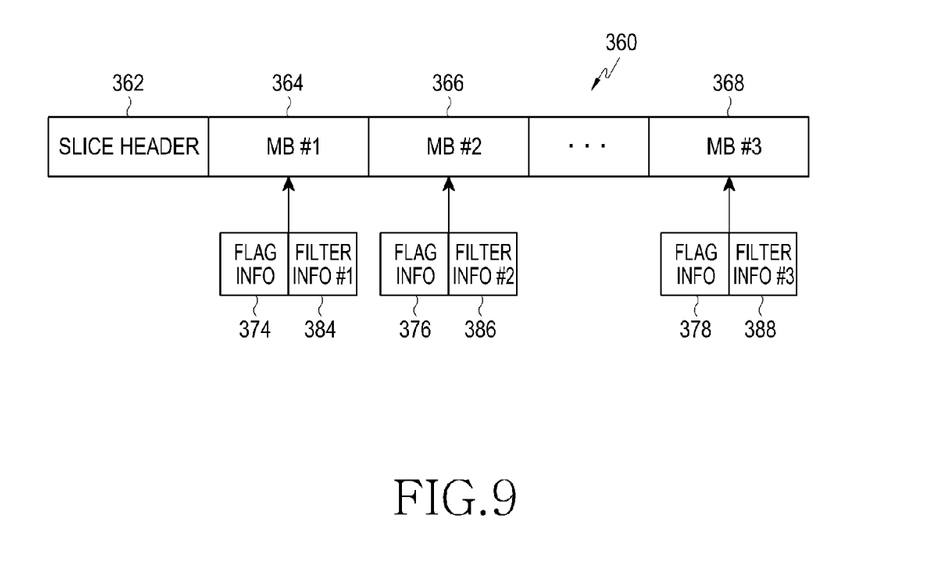

Referring to FIG. 9, reference numeral 360 denotes a slice including interpolation filter information according to a fourth embodiment of the present invention. The slice 360 may include a slice header 362 and a plurality of MBs 364, 366 and 368 as slice data. The slice header 362 may include information about the type and order of the slice. The plurality of MBs 364, 366 and 368 further include flag information 374, 376 and 378 indicating use of new interpolation filters selected according to context information such as coding mode information, QPs, position information, and resolutions of the MBs and information 384, 386 and 388 about interpolation filters selected for the MBs. The flag information 374, 376 and 378 may be set as illustrated in FIG. 8.

Figure 10:
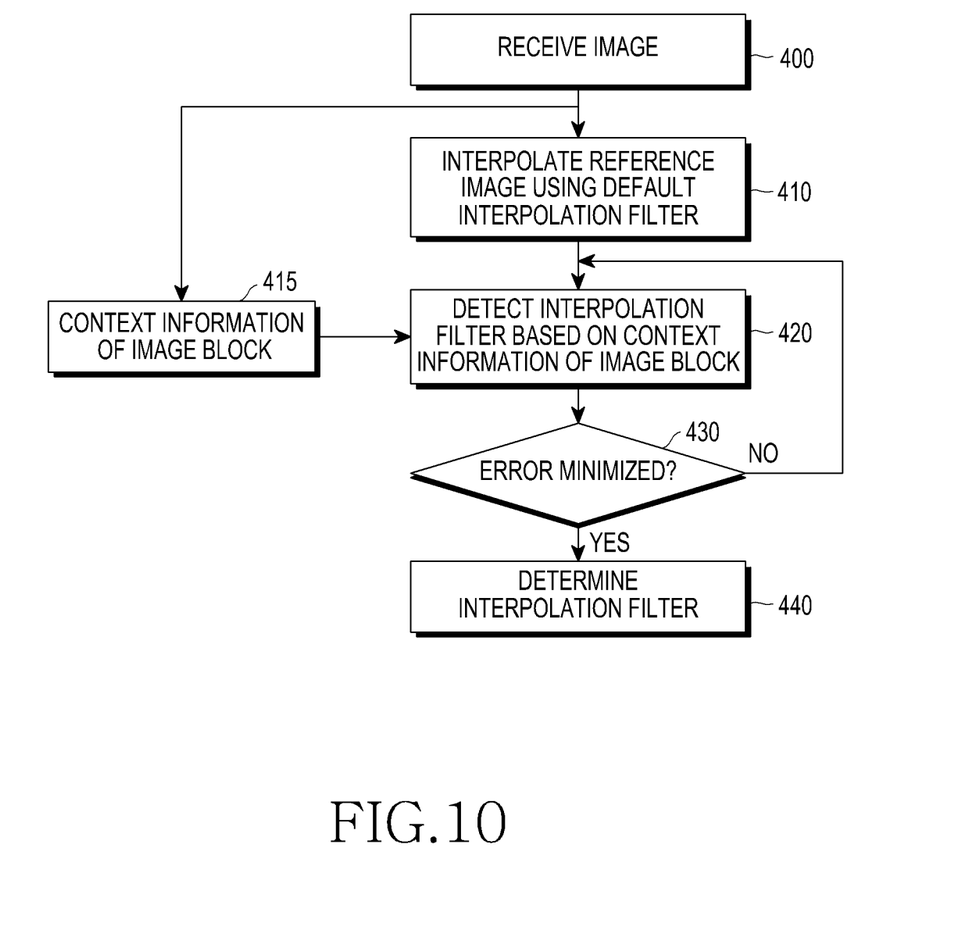
FIG. 10 is a flowchart illustrating an operation for selecting an interpolation filter according to the present invention.

FIG. 10 is a flowchart illustrating an operation for adaptively selecting a specific interpolation filter from among groups of adaptive interpolation filters according to the present invention.

Referring to FIG. 10, upon receipt of an image, an interpolation processor interpolates a reference image block using a default interpolation filter in step 410. Interpolation is performed on a current image block and a reference image block on the basis of an MB of a predetermined size.

In step 415, the interpolation processor checks context information of the input image block including information about the coding mode, QP value, position, and resolution of the input image block.

The interpolation processor selects an interpolation filter from among a plurality of filter groups, taking into account the MB size, coding mode information, QP value, the position of a pixel to be encoded, resolution, and edge information of the image block in step 420. The interpolation processor interpolates the input image block using the selected interpolation filter. An interpolation filter used for a previous input image block may be selected for interpolation of the current input image block, first of all, because the temporal and spatial correlations between the image block to be encoded and adjacent image blocks are high in the same video slice.

In step 425, the interpolation processor checks the error difference between the current image block and the reference image block using the selected interpolation filter. If the interpolation result of the interpolation filter selected in step 420 has a minimum error difference, the interpolation processor determines the selected interpolation filter as an optimum interpolation filter in step 430. On the other hand, if the error difference is not minimal, the interpolation processor selects another interpolation filter for the input image block in step 420. That is, the interpolation is repeated until a specific interpolation filter that minimizes the error between the reference image block and the current input image is adaptively selected from the plurality of filter groups.

Figure 11:
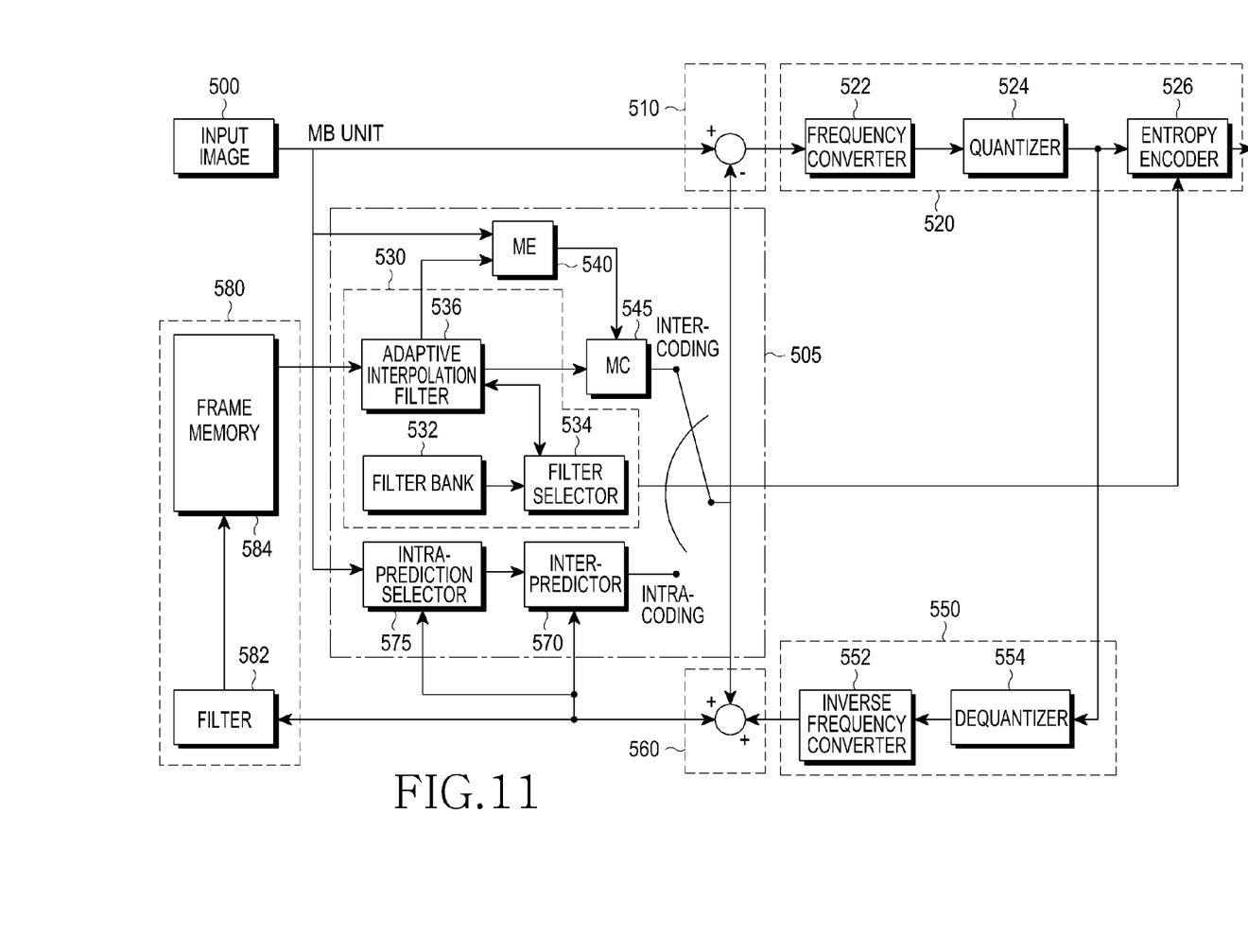
FIG. 11 is a block diagram of a video coding apparatus according to the present invention.

FIG. 11 is a block diagram of a video coding apparatus according to the present invention.

Referring to FIG. 11, the video coding apparatus includes a prediction block generator 505, an image block generator 510, a differential image block encoder 520, a differential image block decoder 550, an image block recoverer 560, and a reference image block data generator 580.

One of an I-slice, a P-slice, and a B-slice distinguished by type is received as an input image 500. The input slice is processed on an MB basis. An MB is a predefined image processing block unit of size 16×16, 16×8, . . . , 4×4.

The image block generator 510 generates a differential image block by combining an image block of a predetermined MB size with a prediction block having a minimum error with the current image block, received from the prediction block generator 505. The prediction block generator 505 generates a prediction block by applying the higher-efficiency mode between intra-coding mode and inter-coding mode to a reference image block encoded by the differential image block encoder 520 and decoded by the differential image decoder 550. Therefore, the image block generator 510 performs more accurate coding using the prediction block received from the prediction block generator 505.

The differential image block encoder 520 includes a frequency converter 522, a quantizer 524, and an entropy encoder 526.

The frequency converter 522 converts pixel information of a space-domain input image block to frequency-domain spectrum data. The frequency converter 522 generally performs DCT and generates a DCT block on an MB basis.

The quantizer 524 quantizes a spectrum data coefficient block received from the frequency converter 522. Herein, the quantizer 524 may quantize the spectrum data to a predetermined scalar value using a variable step size, taking into account the slice type of the input image. In the present invention, the quantizer 524 may quantize the spectrum data by applying a QP using a step size that is variable according to the slice type of the image and the per-MB characteristics of the image. The quantizer 524 applies a variable QP based on a target bit rate for compression or a fixed coding bit rate, considering a current radio channel environment.

The entropy encoder 526 compresses information received from the quantizer 524, inclusive of information about the slice type and MB context information of the image. Especially, the entropy encoder 526 further outputs information about an interpolation filter selected for generation of a prediction block at the prediction block generator 505 according to the present invention. The interpolation filter information may contain a differential filter coefficient between a default interpolation filter and the interpolation filter selected for prediction block generation, or the index number of a filter group to which the selected interpolation filter belongs. Or the interpolation filter information may include a differential filter coefficient between a filter used for a previous prediction image and the filter selected for the current input image.

The entropy encoder 526 may be implemented by arithmetic coding, Huffman coding, run-length coding, etc. The entropy encoder 526 encodes compressed image information at a preset bit rate.

The differential image block decoder 550 generates an inverse differential image block by decoding the differential image block received from the differential image block encoder 520. The differential image block decoder 550 includes a dequantizer 554 and an inverse frequency converter 552.

The dequantizer 554 dequnatizes the differential image block using a step size quantized according to the QP. The inverse frequency converter 552 performs an operation inverse to the operation of the frequency converter 522. That is, the inverse frequency converter 552 generates the inverse differential image block by inverse DCT. Data loss may occur between the inverse differential image block output from the inverse frequency converter 552 and the differential image block generated from the differential image block generator 510, in correspondence to the QP applied to quantization and dequantization. Therefore, an adaptive QP is required, taking into account the video characteristics of the input image block.

The image block recoverer 560 generates a more accurate reference image block by comparing the inverse differential image block with the differential image block generated from the differential image block generator 510.

The reference image data generator 580 includes a frame memory 584 and a filter 582. The filter 582 filters a distorted reference image block from among reference image blocks output from the image block recoverer 560 because the reconstructed reference image block is image data involving distortion with respect to the original input image block. The frame memory 584 stores reconstructed image blocks to predict the next frame. The frame memory 584 stores reference image blocks from which discontinuity was eliminated by the filter 582. The reference image blocks are reconstructed image blocks applied to the next input image block.

According to the present invention, upon receipt of an image block to be encoded, the prediction block generator 505 determine whether to generate a prediction block by intra-coding or inter-coding, taking into account the characteristics of the current image block. The prediction block generator 505 includes an inter-prediction block generator and an intra-prediction block generator.

The inter-prediction block generator includes a reference image interpolation processor 530 having an adaptive interpolation filter 536, a filter bank 532, and a filter selector 534, a motion estimator 540, and a motion compensator 545. The intra-prediction block generator includes an intra-prediction selector 575 and an intra-predictor 570.

In case of inter-coding, upon receipt of the input image block to be encoded, the filter selector 534 of the reference image interpolation processor 530 selects the adaptive interpolation filter 536 from among a plurality of filter groups in the filter bank 532, according to context information of the image block, for example, information about the size of an MB, information of the coding mode of the MB based on the size information, information about the position of a specific pixel in the MB to be interpolated, the resolution of pixels generated after interpolation, and edge information of the image block. The selected adaptive interpolation filter 536 interpolates a reference image block having minimum temporal and spatial correlations with the input image block, extracted from the frame memory 584. The interpolation is repeated until the error between an interpolated reference image block and the coded current image.

The motion estimator 540 estimates a motion using the interpolated reference image block and the input image block. The motion compensator 545 generates a final inter-prediction block through motion compensation using a motion vector set for each MB.

In other words, the reference image interpolation processor 530 selects an optimum adaptive interpolation filter 536 reflecting the characteristics of the image, according to the context information of the input image block and the reference image block and generates an inter-prediction block using the interpolation filter having a minimum error difference, through iterative interpolations. The reference image interpolation processor 530 checks information about the used interpolation filter and transmits the interpolation filter information to a receiver so that the receiver can decode a received image block using the same interpolation filter. The reason for iterative interpolations of the reference image block is to generate a more accurate prediction block by accurate pixel compensation of the reference image block.

Meanwhile, the reference image interpolation processor 530 may interpolate the reference image block using information about an adaptive interpolation filter used for a previous image block, instead of the context information of the image block, encode the interpolated reference image block, and transmit the encoded image block. Further, the reference image interpolation processor 530 may encode only a differential filter coefficient between the interpolation filter used for the input image block and the default interpolation filter or the interpolation filter selected for the previous image block, and thus may transmit the encoded differential filter coefficient.

In case of intra coding, the intra-prediction selector 575 selects a reference image block having a high spatial correlation with the input image block from the frame memory 584. The intra-predictor 570 performs intra-coding on the extracted reference image block in a predetermined coding mode and outputs the intra-prediction block.

Thus, the prediction block generator 505 selects a prediction block with a higher coding efficiency, that is, a prediction block with a smaller error with respect to the current image block as a final prediction block by comparing the inter-prediction block received from the inter-prediction block generator with the intra-prediction block received from the intra-prediction block generator.

Figure 12:
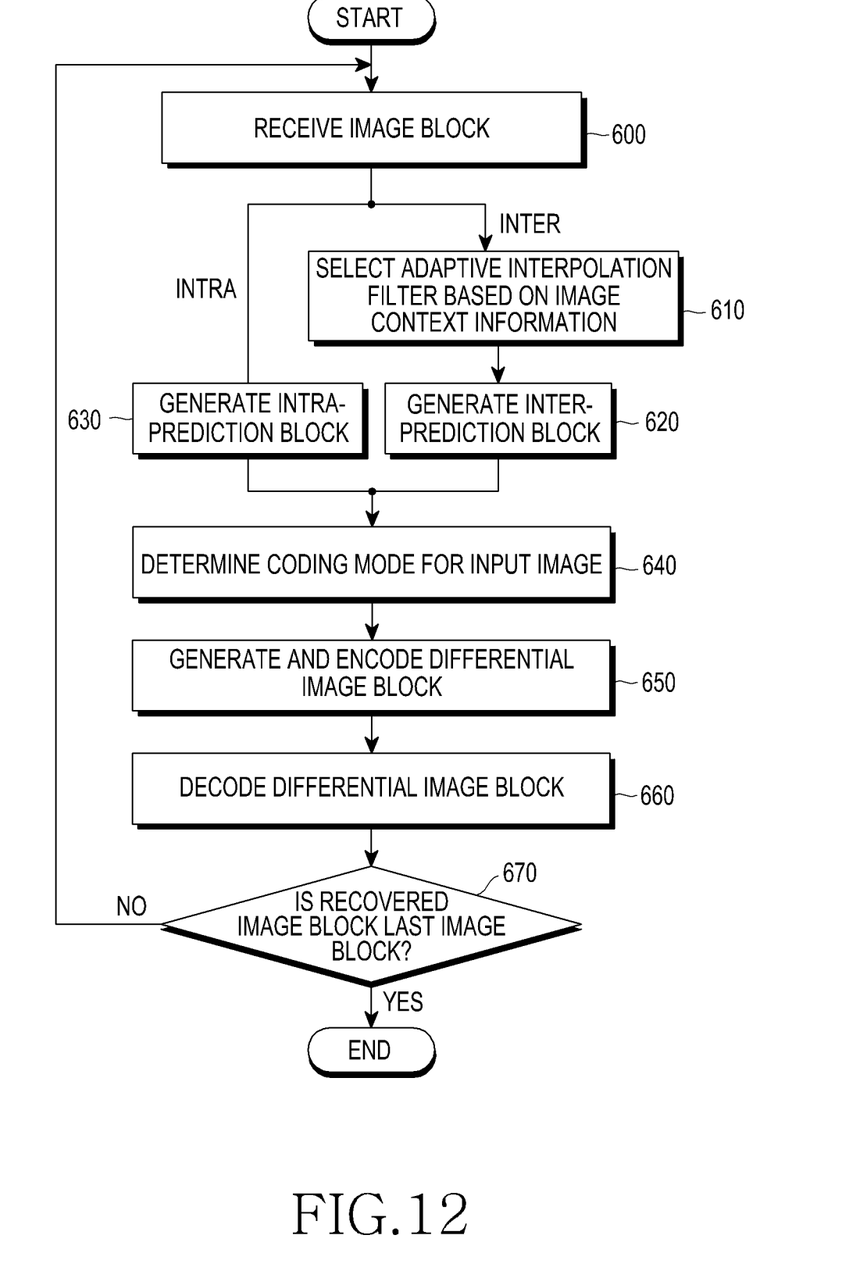
FIG. 12 is a flowchart illustrating a video coding operation according to an embodiment of the present invention.

FIG. 12 is a flowchart illustrating a video coding operation according to an embodiment of the present invention.

Referring to FIG. 12, an input unit receives an image block in step 600.

In step 610, the prediction block generator selects interpolation filters adaptively according to context information of the current input image block. The prediction block generator performs interpolation repeatedly using the selected interpolation filters and generates an inter-prediction block using a final interpolation filter having a minimum error with respect to the current image block in step 620.

Meanwhile, the prediction block generator generates an intra-prediction block in the intra-coding mode in step 630.

That is, the prediction block generator generates an intra-prediction block by applying an optimum intra-coding mode to a reference image block with a possible highest spatial correlation with respect to the current input image block, which was encoded, decoded, and then stored. Herein, the prediction block generator may generate a prediction block to which a motion vector is applied spatially in a horizontal or vertical direction with respect to the current input image block. That is, an intra-prediction block is generated for the current input image block, using a reference image block that was encoded, decoded and then stored.

In step 640, the prediction block generator selects a final prediction block with a higher coding efficiency between the inter-prediction block and the inter-prediction block by comparing them. Then the prediction block generator determines the coding mode of the selected prediction block as the coding mode of the input image block.

The differential image block generator generates a differential image block between the current image block and the prediction block generated from the prediction block generator in step 650. To be more specific, the differential image block refers to an image block composed of a residual signal corresponding to the error difference between the input current image block and the prediction block generated in the mode selected between the inter-coding mode and the intra-coding mode by the prediction block generator.

The differential image block encoder encodes the differential image block in step 660. The bit stream of the encoded differential image block is transmitted to a receiver. The bit stream further includes information about the interpolation filter used adaptively according to the inter-coding mode in the present invention.

In step 670, the differential image decoder decodes the encoded differential image block. Thus, a reference image block is generated for the next input image block by reconstructing the differential image block, and stored in a separate memory.

The prediction block generator determines whether the recovered image block is the last image block of the current input slice in step 670. Steps 600 to 670 are repeated or the procedure ends, according to the determination.

Figure 13:
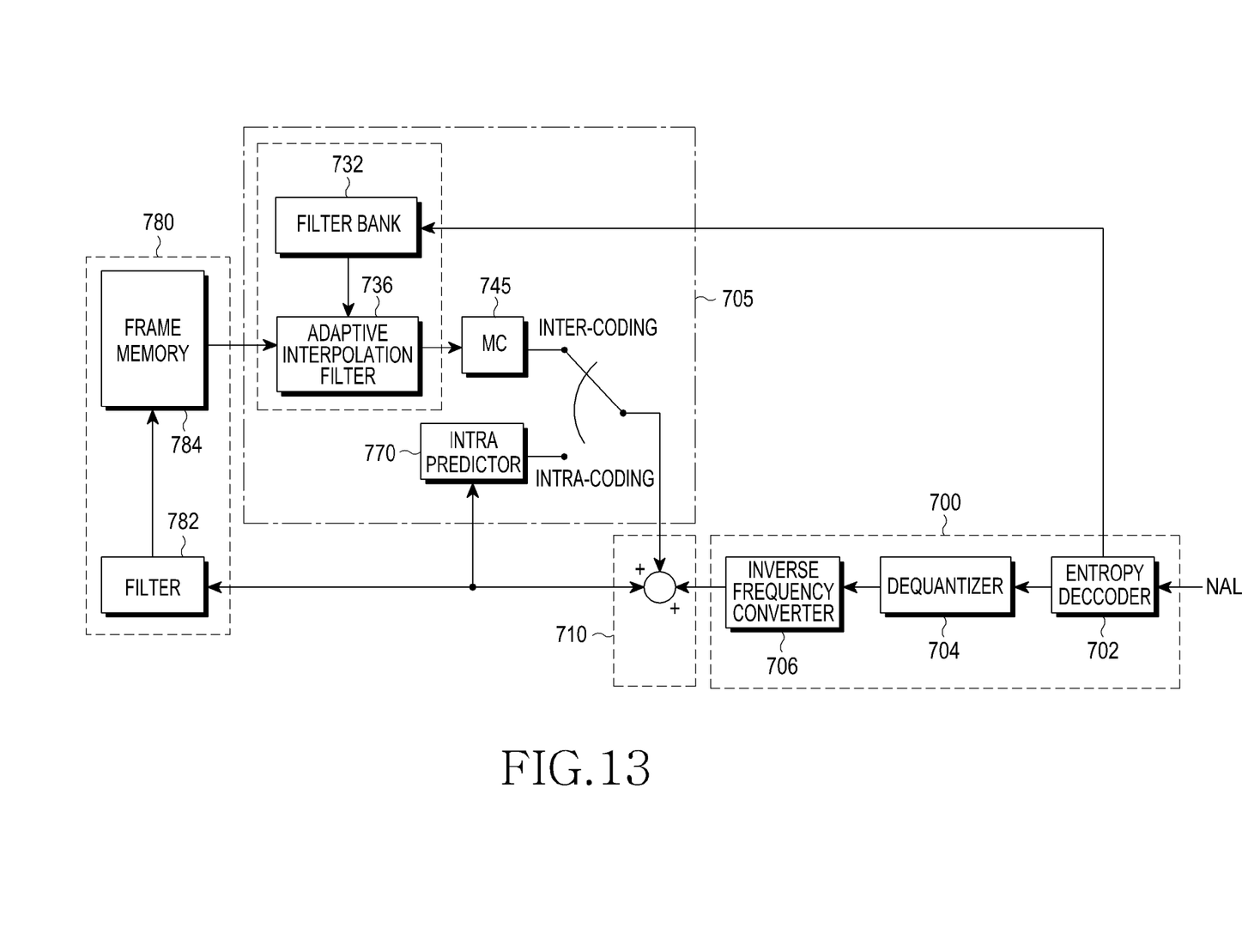
FIG. 13 is a block diagram of a video decoding apparatus according to the present invention.

FIG. 13 is a block diagram of a video decoding apparatus according to the present invention.

Referring to FIG. 13, the video decoding apparatus includes an image block decoder 700, an image block recoverer 710, a prediction block generator 705, and a reference image block data generator 780.

The image block decoder 700 includes an entropy decoder 702, a dequantizer 704, and an inverse frequency converter 706.

The entropy decoder 702 acquires information about an image block from a received bit stream. According to the present invention, the information about the image block further includes information about an interpolation filter selected for generating a prediction block at a transmitter.

The interpolation filter information may include a differential filter coefficient between a default interpolation filter and the interpolation filter selected for generation of the prediction block, or the index of a filter group to which the selected interpolation filter belongs. Or the interpolation filter may include a differential filter coefficient between an interpolation filter used for a previous prediction image and the interpolation filter selected for the current input image block. Or the interpolation filter information may further include flag information indicating whether a default interpolation filter or the selected interpolation filter is used.

The entropy decoder 702 acquires context information of the compressed image block, the MB size and coding mode information of the image block, the QP of the MB, information about the positions of pixels in the MB to be encoded, and the resolution and edge information of the image.

The dequantizer 704 dequantizes the image block using a step size quantized based on the QP of the image block. The inverse frequency converter 706 converts the data of the image block to spectrum data through inverse DCT. Herein, image block data decoded by the image block encoder 700 is differential image block data.

The prediction block generator 705 generates a prediction block for the decoded differential image block data. Especially the prediction block generator 705 determines whether the differential image block data is data encoded in the inter-coding mode or the intra-coding mode, referring to the received interpolation filter information.

When determining that the prediction block generation mode of the differential image block data is the inter-coding mode, a specific interpolation filter 736 is selected from among a plurality of filter groups in a filter bank 732. The selected interpolation filter 736 interpolates a reference image block having minimum temporal and spatial correlations with respect to the input image block, extracted from a frame memory 784. The interpolation is repeated until the error between an interpolated reference image block and the encoded current image is minimized. That is, an inter-prediction block is generated using an image block interpolated by the selected filter.

The interpolation filter information may include a differential filter coefficient between the default interpolation filter and the interpolation filter selected for generation of the prediction block, or the index of a filter group to which the selected interpolation filter belongs. Or the interpolation filter may include a differential filter coefficient between an interpolation filter used for a previous prediction image and the interpolation filter selected for the current input image block. Therefore, a filter is selected for the current image by applying a filter coefficient to the filter used for the previous image block using the differential filter coefficient.

On the other hand, if the prediction block generation mode of the differential image block data is the intra-coding mode, an intra-prediction block generator 770 generates an intra-prediction block by applying a predetermined coding mode to the reference image block extracted from the frame memory 784.

The image block recoverer 710 recovers the image block by adding the prediction block generated from the prediction block generator 705 to the differential image block data decoded by the image block decoder 700.

The reference image block data generator 780 stores image blocks filtered by the filter 782 from among the recovered image blocks as reconstructed reference image blocks in the frame memory 784, for use in predicting the next input image.

Figure 14:
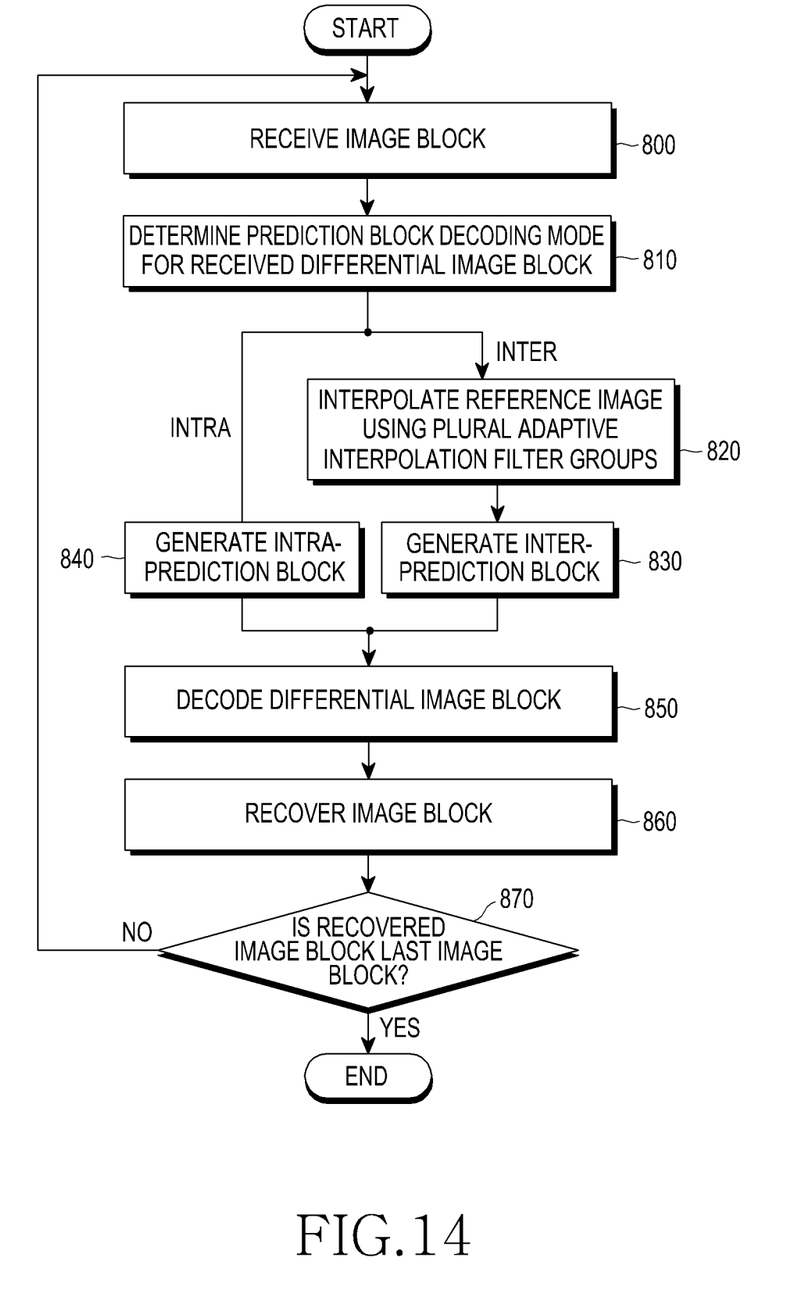
FIG. 14 is a flowchart illustrating a video decoding operation according to an embodiment of the present invention.

FIG. 14 is a flowchart illustrating a video decoding operation according to an embodiment of the present invention.

Referring to FIG. 14, an input unit receives the data of an encoded bit stream in step 800. The image block decoder determines the prediction block coding mode of a differential image block from the received bit stream data in step 810. That is, the image block decoder determines whether the input image block was compressed in the inter-coding mode or the intra-coding mode and determines a decoding mode for the received image block according to the determined coding mode. If it is determined that the input image block is an independent image block that has a low temporal correlation with a previous image block, the procedure goes to step 840.

On the contrary, if it is determined that the input image block requires temporal correlation with the previous image block, the procedure goes to step 820. In addition, if the input image block has a relatively high temporal correlation with the previous image block but includes significant image data, an inter-prediction block is generated in step 840.

The prediction block generator generates a prediction block to which a motion vector is applied spatially in a horizontal or vertical direction from the current input image block in step 840. That is, the inter-prediction block is generated for the current input image block, using a reference image block that was encoded, decoded, and then stored.

Meanwhile, the prediction block generator adaptively selects interpolation filters according to context information of the current input image block in step 820. That is, the prediction block generator repeats interpolation using the selected interpolation filters. In step 830, the prediction block generator generates an inter-prediction block using a final interpolation filter having a minimized error with the current image block. That is, the prediction block generator may select an interpolation filter adaptively using interpolation filter information included in the bit stream data.

The interpolation filter information may include a differential filter coefficient between a default interpolation filter and the interpolation filter selected for generation of the prediction block, or the index of a filter group to which the selected interpolation filter belongs. Or the interpolation filter may include a differential filter coefficient between an interpolation filter used for a previous prediction image and the interpolation filter selected for the current input image block. Therefore, a filter is selected for the current image by applying a filter coefficient to the filter used for the previous image block using the differential filter coefficient.

In step 850, the prediction block generator outputs, as a final prediction block, a block having a good coding efficiency, that is, a block having the smallest error difference with respect to the current input image block between the inter-prediction block output through the inter-coding and the intra-prediction block output through the intra-coding.

The image block decoder recovers an image block by adding the final prediction block generated from the prediction block generator to the decoded differential image block data in step 860. In step 870, the image block decoder determines whether the recovered image block is the last image block and continues or ends the video decoding operation according to the determination result.

The video coding and decoding apparatuses according to the embodiments of the present invention perform interpolation by selecting an interpolation filter reflecting the characteristics of an image according to context information of an image block, through iterative processes. Therefore, a more accurate prediction block is generated and thus video compression is more accurate and highly efficient.

While the present invention has been particularly shown and described with reference to embodiments thereof and the drawings, it will be understood by those of ordinary skill in the art that various changes in form and details may be made therein without departing from the spirit and scope of the present invention. Therefore, the scope of the present invention should be determined by the appended claims and their legal equivalents, not by the above description.

The invention claimed is:

1. An apparatus for encoding an image, comprising:
a selector for adaptively selecting an interpolation filter for generating a prediction block by taking into account context information including at least one of coding mode information, a quantization value, pixel position information indicating whether a pixel to be encoded is located in an area at a boundary between two image blocks, and a pixel resolution of an image block;
a filter bank for storing a plurality of interpolation filters arranged in groups according to the context information; and
a prediction block generator including a specific interpolation filter which is selected from the filter bank under control of the selector, for interpolating a reference image block related to an input image block.

2. The apparatus according to claim 1, wherein the selector selects, as the interpolation filter for generating the prediction block for the input image block, an interpolation filter that minimizes an error difference between the input image block and the reference image block.

3. The apparatus according to claim 1, wherein the prediction block generator further includes an inter-predictor for generating an inter-prediction block by performing inter-coding using the specific interpolation filter.

4. The apparatus according to claim 3, wherein the prediction block generator further includes an intra-predictor for generating an intra-prediction block by performing intra-coding on the reference image block and outputting a block having a smaller error difference as a final prediction block by comparing the inter-prediction block or the intra-prediction block with the input image block.

5. The apparatus according to claim 4, further comprising an image block generator for generating a differential image block by combining the input image block with the final prediction block.

6. The apparatus according to claim 5, further comprising:
a frequency converter for converting the differential image block to spectrum data;
a quantizer for quantizing the spectrum data received from the frequency converter using a quantization value that changes in correspondence with the input image block; and
an entropy encoder for encoding image information received from the quantizer and interpolation filter information determined by the prediction block generator, according to a predetermined bit rate.

7. The apparatus according to claim 6, further comprising:
a dequantizer for dequantizing the image information received from the quantizer using the quantization value;
an inverse frequency converter for generating an inverse differential image block by inverse frequency conversion of the dequantized image information; and
a differential image block recoverer for generating a reference image block by comparing the inverse differential image block with the differential image block.

8. The apparatus according to claim 7, further comprising:
a filter for filtering by checking discontinuity in the reference image block; and
a frame memory for storing at least one filtered reference image block.

9. The apparatus according to claim 1, wherein the groups comprise a first filter group including interpolation filters arranged in a first order of at least one of quantization values and pixel positions and pixel resolutions of the image block when the coding mode information is applied to the input image block on a first pixel size basis, and a second filter group including interpolation filters arranged in a second order of at least one of quantization values and pixel positions and pixel resolutions of the image block when the coding mode information is applied to the input image block on a second pixel size basis different from the first pixel size basis.

10. A method for encoding an image, comprising:
adaptively selecting an interpolation filter from a filter bank that stores a plurality of interpolation filters arranged in groups according to context information by taking into account the context information, the context information including at least one of coding mode information, a quantization value, pixel position information indicating whether a pixel to be encoded is located in an area at a boundary between two image blocks, and a pixel resolution of an image block;
interpolating a reference image block related to an input image block using the selected interpolation filter; and
determining, as an interpolation filter for generating a prediction block for the input image block, an interpolation filter that minimizes an error difference between the input image block and the reference image block.

11. The method according to claim 10, wherein the adaptive interpolation filter selection comprises selecting an interpolation filter for a next input image block by checking a differential filter coefficient between a default interpolation filter and the selected interpolation filter.

12. The method according to claim 10, wherein the adaptive interpolation filter selection comprises selecting an interpolation filter by checking an index of a filter group to which the interpolation filter selected for interpolating the reference image block related to the input image block.

13. The method according to claim 10, further comprising:
generating an intra-prediction block by performing intra-coding on the reference image block; and
outputting a block having a smaller error difference as a final prediction block by comparing the inter-prediction block or the intra-prediction block with the input image block.

14. The method according to claim 13, further comprising generating a differential image block by combining the input image block with the final prediction block.

15. The method according to claim 14, further comprising:
converting the differential image block to spectrum data;
quantizing the spectrum data using a quantization value that changes in correspondence with the input image block; and
encoding the quantized image block information and information about the selected interpolation filter according to a predetermined bit rate.

16. The method according to claim 15, further comprising:
dequantizing the quantized image block information using the quantization value;
generating an inverse differential image block by inverse frequency conversion of the dequantized image block information; and
generating a reference image block by comparing the inverse differential image block with the differential image block.

17. The method according to claim 10, wherein the groups comprise a first filter group including interpolation filters arranged in a first order of at least one of quantization values and pixel positions and pixel resolutions of the image block when the coding mode information is applied to the input image block on a first pixel size basis, and a second filter group including interpolation filters arranged in a second order of at least one of quantization values and pixel positions and pixel resolutions of the image block when the coding mode information is applied to the input image block on a second pixel size basis different from the first pixel size basis.

* * * * *